No. 817,459. PATENTED APR. 10, 1906.
W. H. & S. A. WILSON.
RAILWAY SIGNAL APPARATUS.
APPLICATION FILED OCT. 9, 1905.
6 SHEETS—SHEET 1.
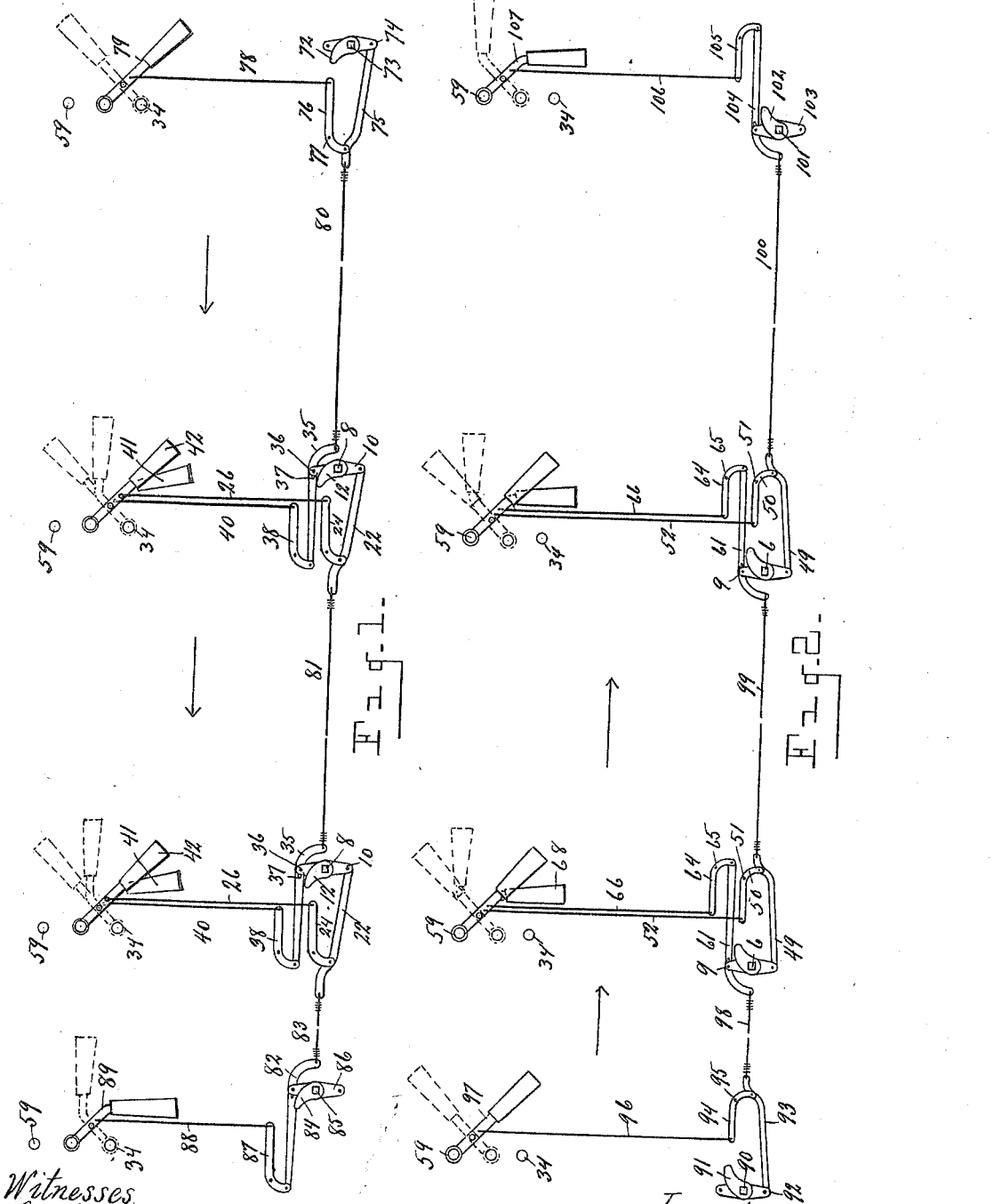

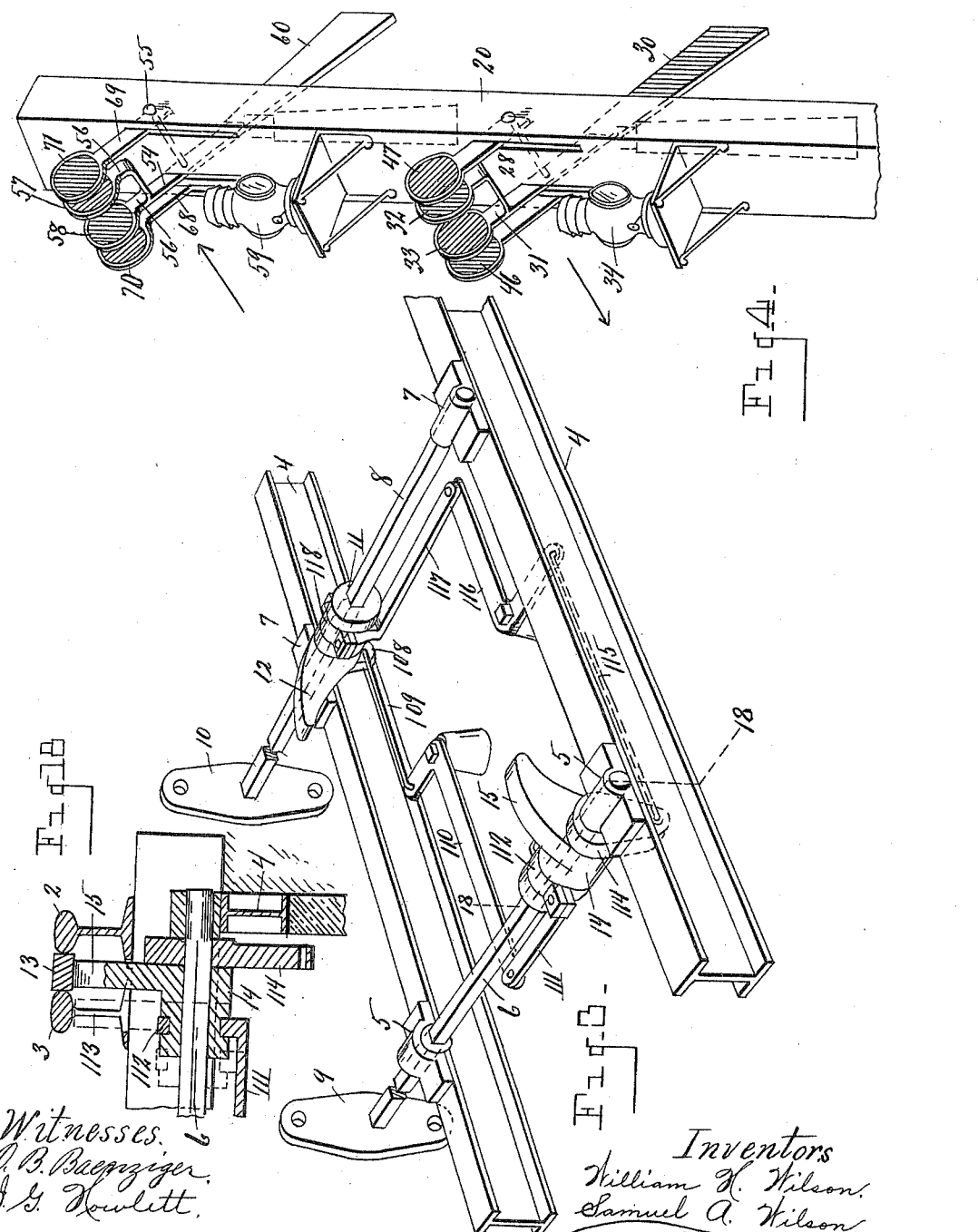

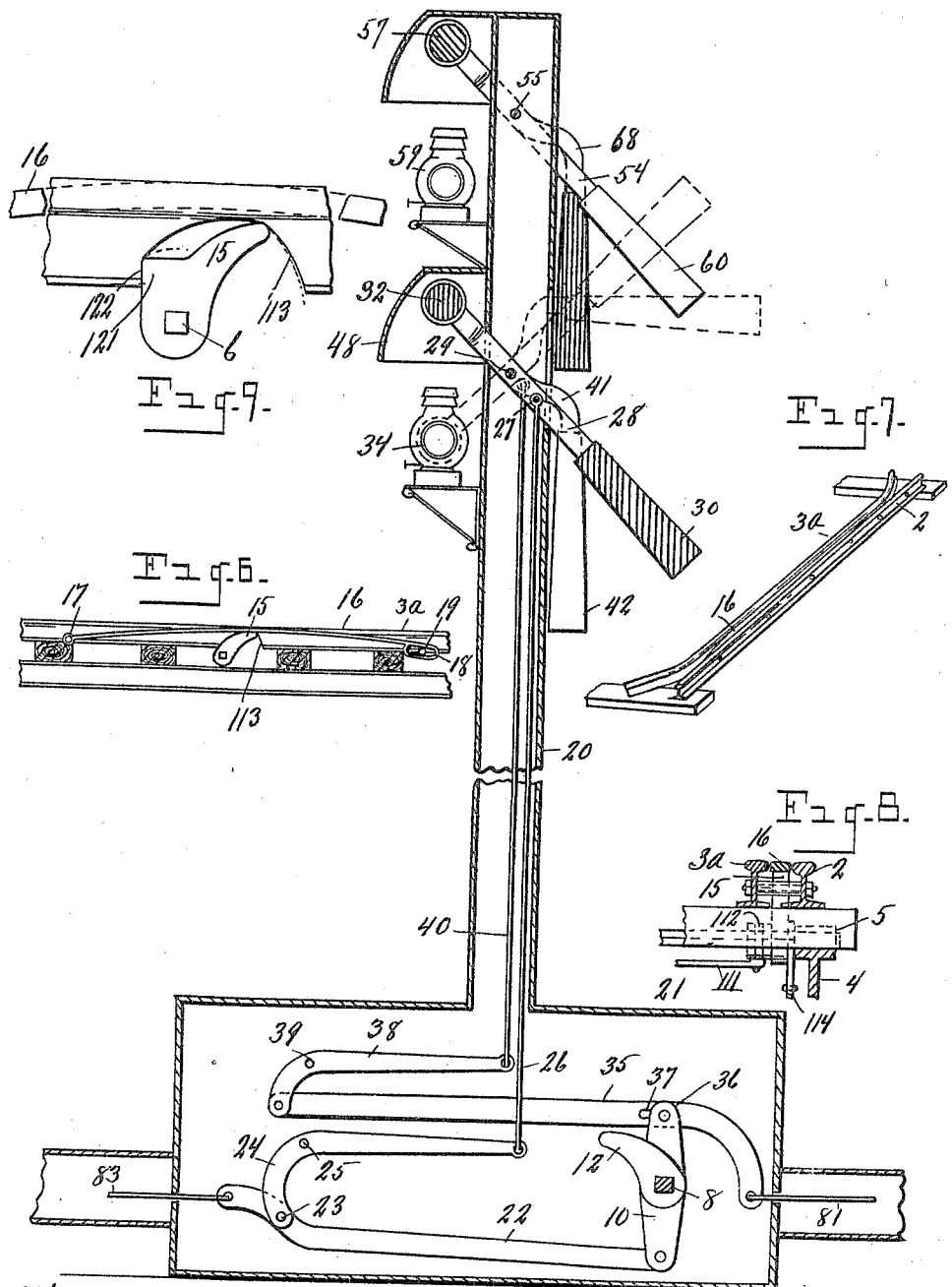

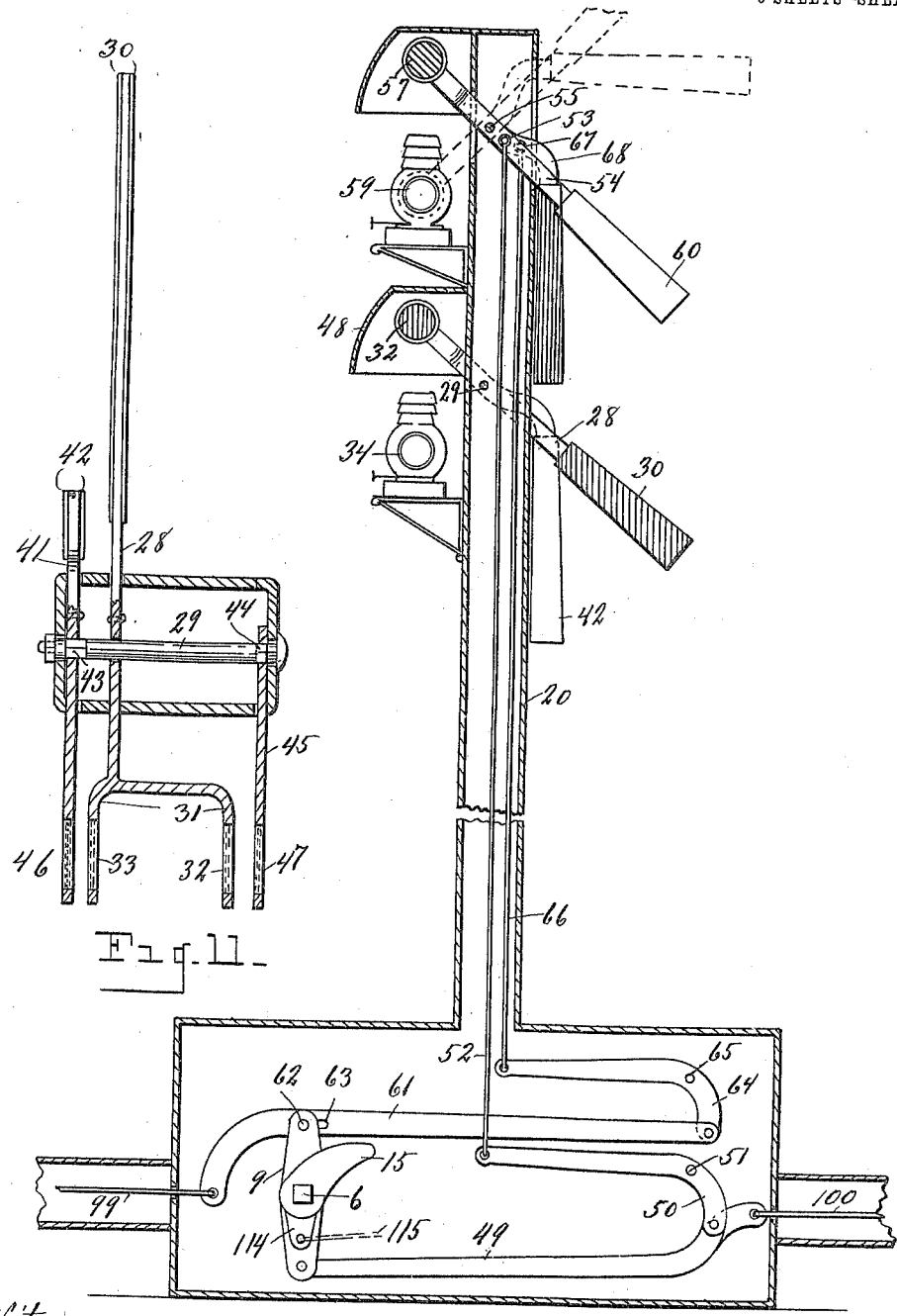

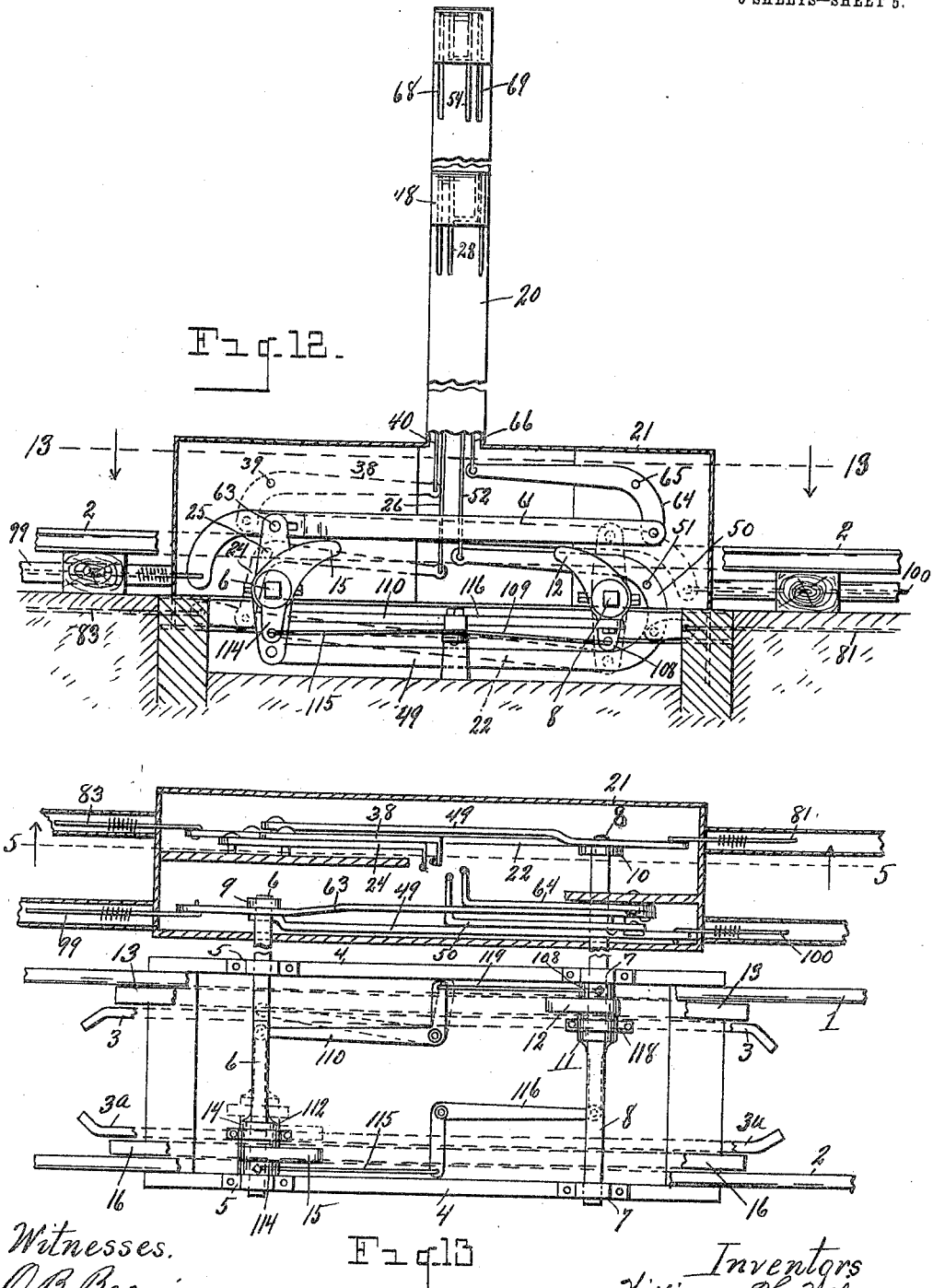

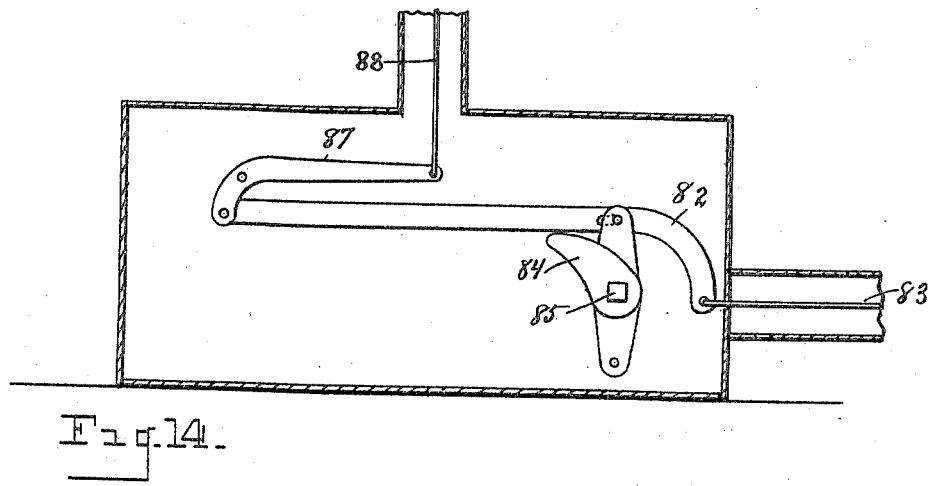
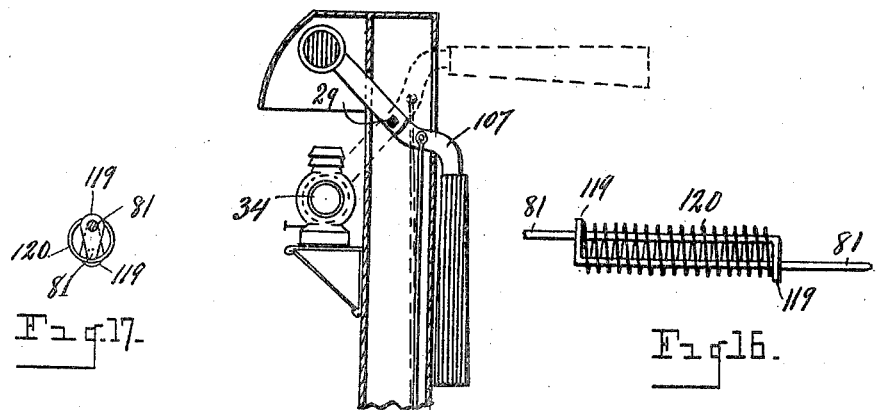
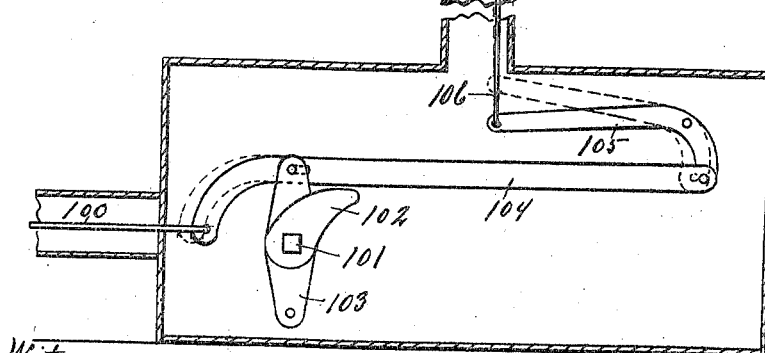

UNITED STATES PATENT OFFICE.

WILLIAM H. WILSON AND SAMUEL A. WILSON, OF FLINT, MICHIGAN.

RAILWAY SIGNAL APPARATUS.

No. 817,459.  Specification of Letters Patent.  Patented April 10, 1906.

Application filed October 9, 1905. Serial No. 281,894.

*To all whom it may concern:*

Be it known that we, WILLIAM H. WILSON and SAMUEL A. WILSON, citizens of the United States, residing at Flint, in the county of Genesee, State of Michigan, have invented certain new and useful Improvements in Railway Signal Apparatus; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to railway signaling apparatus especially designed for use in connection with a block-signaling system; and it consists in the construction and arrangement of parts hereinafter fully set forth, and pointed out particularly in the claims.

The objects of the invention are to provide simple and efficient means for automatically displaying train-signals by the passage of the train over the track in advance of the train and in the rear thereof as well, holding a train in the rear from entering the same block with the train in advance, and preventing the train from the opposite direction on the same track entering the same block with the advancing train.

A further object is to provide signals for day and night service and for trains going in opposite directions.

A further object is to provide means for automatically preventing the operation of the signals arranged for a westwardly-moving train by a train moving eastwardly over the track, and vice versa.

A further object is to provide for restoring the signaling mechanism by the passage of a train over the track in either direction, thereby leaving the mechanism in position to be actuated by a succeeding train.

The above objects are attained by the mechanism illustrated in the accompanying drawings, in which—

Figure 1 is a diagrammatical view of the signals and actuating mechanism therefor arranged for a train moving in the direction indicated by the arrows in said figure. Fig. 2 is a similar view of the signals and actuating mechanism arranged for a train moving in the opposite direction, as indicated by the arrows. Fig. 3 is a perspective view of one set of the signal-operating mechanism as located in the track in position to be actuated by the passage of a train in either direction. Fig. 4 is a perspective view of one of the signal-towers, showing the signal-lights and the upper and lower sets of signals mounted in said stand and adapted to be carried over said lights in the operation of the system to indicate the position of a train upon the track going in either direction. Fig. 5 is a central vertical section through one of the signal-towers and the housing at the base thereof, showing the movable signals pivoted in the tower and the operating mechanism connected thereto through vertically-extending rods, said mechanism being adapted to operate the lower set of signals only, the line on which said section is taken being indicated by dotted line 5 5 of Fig. 13. Fig. 6 is an elevation showing the tread spring or plate adapted to be engaged by the wheel or other part of an engine or car and the movable arm on one of the rock-shafts of the track mechanism lying under said tread-plate to be actuated as said plate is depressed. Fig. 7 is a perspective view of a section of the track, showing a portion of the main rail and the guard-rail adjacent thereto, between which rails the tread-plate is mounted. Fig. 8 is a transverse section through the main and guard rails and through said tread-plate, other parts appearing in elevation and in fragmentary section. Fig. 9 is a fragmentary view in elevation of a portion of the guard-rail and the curved arm on the rock-shaft which lies thereunder. Fig. 10 is a central vertical section through the signal-tower and housing at the base thereof, showing the mechanism therein for operating the upper set of signals only. It should be borne in mind, however, that each signal-tower and housing at the base thereof contain both sets of the operative mechanism shown in Figs. 5 and 10, said mechanism being separated in said figures in the interest of clearness. Fig. 11 is a horizontal section through the signal-tower and through a set of the signals. Fig. 12 is a view, partly in section, through one of the housings at the base of a signal-tower, showing both sets of the signal-operating mechanism therein and also showing in elevation a portion of the track mechanism. Fig. 13 is a horizontal section as on line 13 13 of Fig. 12. Fig. 14 is an enlarged sectional view through a housing at the base of a signal-tower, showing an enlarged elevation of the signal-actuating mechanism contained in the group of parts at the left of Fig. 1. Fig. 15 is a view similar to Fig. 14 of the group of parts at the right of Fig. 2, showing in elevation a portion of the signal-tower and the signal mounted therein. Fig. 16 is an elevation of the spring-joint located in the connecting-rods that join the mechanism between two of the signal-towers. Fig. 17 is an end elevation of Fig. 16. Fig. 18 is a transverse section as on line 18 18 of Fig. 3, the track and guard rails and the depressible tread plate or spring being added and showing in transverse section.

In explanation of Figs. 1, 2, 5, 10, and 15 we wish to state that the position in which the signals are shown with respect to the operating mechanism is not technically correct, as said signals should stand at right angles to the levers in the housing at the base of the signal-tower which operate them. In other words, the signals in actual use stand at right angles to the track; but in the views above mentioned they are shown as standing parallel with the track for convenience in illustrating the connection therewith of the operating parts. The true position of the signals, however, with respect to the operating mechanism is shown in Figs. 12 and 13.

In the application of this invention a signal-tower and its accompanying mechanism is located at the intersections of the blocks into which the track is divided, said blocks being of such length and employed in such number as the conditions may require.

Referring to the characters of reference, 1 and 2 indicate the rails of a railway-track, and 3 and $3^a$ the guard-rails mounted between and parallel to the track-rails, as shown more clearly in Figs. 7, 8, 12, 13, and 18. Below the rails of the track a suitable cemented excavation is made, across which are strung the I-beams 4. (Shown more clearly in Fig. 3.) Mounted upon said I-beams are the bearing-boxes 5, in which is journaled the square rock-shaft 6. Also mounted upon said I-beams are the bearing-boxes 7, in which is journaled the square rock-shaft 8, parallel with and in proximity to the shaft 6. Upon the inner ends of the rock-shafts 6 and 8 are the arms 9 and 10, respectively, which are centrally secured to their respective shafts and through which the signal mechanism is operated, as hereinafter stated. Mounted to slide longitudinally upon the shaft 8 is a sleeve 11, carrying an upwardly-curved arm 12, adapted to lie between the track-rail 1 and the guard-rail 3 under the curved tread-plate 13, which is so supported between said rails as to permit of its being depressed by the engagement of the flange of the wheel therewith, thereby depressing the curved arm 12 and rocking the shaft 8. Upon the shaft 6 is mounted to slide longitudinally a sleeve 14, similar to sleeve 11 and having projecting upwardly therefrom the curved arm 15, which lies under the tread-plate or depressible curved spring 16, mounted between the track-rail 2 and the guard-rail $3^a$, whereby upon the depression of the tread-plate 13 said arm 15 will be actuated to rock the shaft 6. It will be noted that the sleeves carrying the respective arms 12 and 16 are squared to receive their respective shafts, whereby they are made longitudinally movable upon said shafts and are caused to rock said shafts when depressed. The depressible spring tread-plates 13 and 16 may be mounted in any suitable manner to enable them to be depressed by the passage of the flange of the wheel thereover, so as to actuate their respective shafts 6 and 8. A convenient form of mounting said tread-plates is shown in Fig. 6, wherein one end thereof is pivotally mounted at 17, and the other end is provided with a loop 18, which embraces a pin 19, thereby providing for the elongation of said tread-spring upon the depression thereof and at the same time confining it in place. The position of the tread-springs is such as to cause them to be engaged by the flanges of the wheels as the train is passing over the track, and because of the length and formation of said plates the movement imparted to the rock-shafts through the engagement thereof with the curved arms on said shafts is made more gradual than though said arms were engaged directly by the wheels, insuring a more gradual operation of the signal mechanism and obviating the liability of injury thereto when actuated by a train moving at a high rate of speed.

Each of the signal-towers except those at the terminals of the block system is provided with two sets of signals, one set being termed the "lower" set, which is actuated by trains passing in one direction, and the other set being termed the "upper" set, which is actuated by trains passing in the opposite direction. As the signal-towers and the signal-operating parts are all alike except the terminal towers or signals above mentioned a detailed explanation of the signal mechanism in one of the towers and the associated track mechanism will suffice for all of the signal towers or stations between the terminals of the block system.

Referring now more particularly to Figs. 12 and 13, reference-numeral 20 indicates a signal-tower of any suitable construction and of any desired height, having a hollow interior through which the vertical operating-rods pass and in which the signals are pivotally mounted. At the base of each tower is a housing 21, containing the operating parts connected with the signal-rods and with the track mechanism. Each housing is provided with two sets of signal-operating parts—one set operating the lower signals and the other set operating the upper signals—and for the purpose of convenience and in order to avoid confusion the two sets of signal-operating parts located in each of the signal-towers and housings are separately shown in Figs. 5 and 10, although in reality said parts are associated in a single tower and housing, as shown in Figs. 12 and 13.

Referring now to Fig. 5, in connection with Fig. 13, it will be seen that the rock-shaft 8, carrying the rigidly-attached arm 10, extends into the housing 21 and that the lower end of said arm is pivoted to one end of a draw-bar 22. Pivoted at 23 to said draw-bar is a curved lever 24, which is fulcrumed at 25 and the free end of which is connected to the lower end of the vertically-reciprocatory rod 26, which passes upwardly through the signal-tower and is pivoted at 27 to the signal-arm 28, which is journaled within the tower upon the transverse shaft 29 and the opposite ends of which project through slotted openings in the tower to allow said arm to swing freely upon its pivot. The rearwardly-extending portion of the signal-arm 28 carries a signal-board 30 upon the opposite faces thereof, while the forward portion of said arm, which projects through the front of the signal-tower, is forked, as clearly shown in Fig. 11, the sides 31 of said fork carrying circular frames in which are seated colored glasses, of which the glass 32 is red and the opposite glass 33 is green. The distance between the fork sides 31 is sufficient to allow said fork when the signal-arm is actuated to show the signals at night to stand upon opposite sides of the signal-lamp 34, the light from which shines through said colored glasses to display the desired signals to trains approaching the signal-tower. To the upper end of the arm 10 on shaft 8 is connected the push-bar 35 by means of the pin 36 in said arm, which passes through the slot 37 in said bar. To the opposite end of bar 37 is pivoted the curved lever 38, which is fulcrumed at 39 and to the free end of which is attached the lower end of the vertical rod 40, which passes upwardly through the tower and is pivoted to the angular signal-arm 41, which is mounted upon the shaft 29 and whose rear end projects through a slotted opening in the tower and carries upon the opposite faces thereof the signal-boards 42. It will be noted on referring to Fig. 11 that the shaft 29 at the point where the arm 41 is mounted thereon is squared, as at 43, whereby said arm is made to rotate with said shaft. It will also be noted that the opposite end of said shaft is squared, as at 44, and that mounted upon said squared portion is an auxiliary arm 45, which stands parallel with that portion of signal-arm 41 which projects through the front of the signal-tower. By this arrangement the forwardly-projecting portion of the arm 41 and the auxiliary arm 45 are made to swing in unison by the rocking of the shaft 29 and are held in parallel alinement. In the outer ends of the arms 41 and 45 are colored glasses similar to those in the forked end of arm 28, of which glass 46 is red and glass 47 is green. By this arrangement each of the signal-arms 28 and 41 are mounted to have independent movement and are adapted to shift one past the other, and both are provided with means for displaying lights of the requisite color to approaching trains when operated to carry the glasses in the ends thereof into position upon the opposite sides of lamp 34. Above the lamp 34 is a suitable housing 48, which protects said lamp and under which the signal-glasses are concealed when said signals are not in service. It will be understood that the colored signal-glasses are used in connection with the lamp for night signals and that the signal-boards upon the rear ends of the signal-arms are used for signals in the day-time, the opposite sides of said boards being painted red and white to correspond with the glasses carried in the outer ends of the signal-arms.

The mechanism above described relates to the parts employed for actuating the lower set of signals. The parts employed for actuating the upper set of signals are illustrated more particularly in Fig. 10 and will be described with reference thereto and to Figs. 12 and 13. The inner end of shaft 6, as will be seen, also extends in the housing 21 and carries the arm 9, to the lower end of which is pivoted a draw-bar 49, to which is pivoted a curved lever 50, fulcrumed at 51 and having attached to the free end thereof the lower end of the vertical rod 52, which extends upwardly in the signal-tower and is pivoted at 53 to the signal-arm 54, journaled upon the transverse shaft 55 and projecting at its opposite ends through slotted openings in the wall of the tower. The forward end of said arm 54, like arm 28, is forked at its outer end, and the fork sides 56 thereof carry the signal-glasses, of which the glass 57 is green and the glass 58 is red. These glasses are spaced by means of the fork construction of said arm, so as to cause them to stand upon opposite sides of the lamp 59 when they are pulled downwardly in the operation of signaling, thereby showing a green and a red light upon opposite sides of the lamp. The rear end of the arm 54 is provided with the signal-boards 60, which are painted red and white upon opposite sides of said arm to correspond with the colored glasses carried by said arm at its forward end.

To the upper end of the arm 9 upon rock-shaft 6 is connected the push-bar 61 by means of the pin 62 in said arm, which passes through the slot 63 in said bar. Pivoted to the opposite end of the bar 61 is a curved lever 64, which is fulcrumed at 65 and the free end of which is attached to the lower end of the vertical rod 66, passing upwardly in the signal-tower and pivoted at 67 to the curved signal-arm 68, which is mounted upon the transverse shaft 55 similar to the manner in which signal-arm 41 is mounted upon shaft 29, said signal-arm 68 having to operate in conjunction with its forwardly-extending end, an auxiliary arm 69, fixed to shaft 55 in the manner of connecting auxiliary arm 45 with its operating-shaft, as already explained, so as to cause said auxiliary arm and the outer end of arm 68 to move in unison and simultaneously display the colored glasses carried in the outer ends thereof upon opposite sides of the lamp 59 when actuated in the operation of the signal, the glass 70 being green and the glass 71 being red.

It will now be understood that by means of the track mechanism and the signal-operating parts the signals in the tower will be actuated by a train moving in either direction to display said signals, and thereby indicate the position of the train for purposes hereinafter explained.

Because of the fact that the several sets of signal-operating devices which are interposed between the several blocks of the system are joined through connecting cables or rods and are capable only of joint use it will be necessary in order to explain intelligently the operation of the system to commence with the initial signal-station at the end of the system and describe the operation of the several sets of parts at each signal-tower as the train passes along the track. Beginning at the right of Fig. 1, which illustrates a section of track comprising three blocks and shows four signal-towers, we will describe the operation of the train passing along the track in the direction indicated by the arrows. As the train passes the first signal-tower the flange of the wheel actuates the arm 72 to rock the shaft 73 and cause the arm 74 thereon to be drawn upon the bar 75, which is pivoted to said arm, thereby actuating said bar to operate the curved lever 76, which is pivoted thereto and fulcrumed at 77, carrying upwardly the free end of said lever and moving vertically the rod 78, attached thereto to swing the pivoted signal-arm 79, which corresponds with signal-arm 28, previously described, and carries the colored glass in the end thereof over the lamp, so as to show a red light to a train following. By the same movement of the bar 75 which actuates the signal-arm 79 the rod or cable 80, attached to the forward end of said bar and extending to and connected with the bar 35 in the succeeding set of signal-operating parts, is drawn upon, thereby moving said bar longitudinally and actuating the lever 38, connected therewith, to shove upwardly upon the rod 40 and actuate the signal-arm 41 to carry the glasses in the ends thereof into position upon opposite sides of the lamp 34, showing a green light to the approaching train and a red light upon the opposite side of the lamp, indicating a clear track for the approaching train and setting a red light against a train should it approach from the opposite direction. In the day-time when lights are not in service the boards upon the rearwardly-projecting ends of said arms which are colored white and red, as before described, serve as signals which control the running of the trains. Because of the slot 37 in the bar 35, through which passes the pin 36 of the arm 10, the longitudinal movement of said bar by the cable 80 does not impart any movement to the shaft 8, therefore leaving signal-arm 42 undisturbed. As the train passes the second tower or station the wheels of the train will depress the curved arm 12, thereby rocking the shaft 8 and swinging the arm 10, the upper end of which moves the bar 35 longitudinally and actuates the lever 38 to draw downwardly upon the rod 40 and restore the signal-arm 41 to its normal position at the same time the lower end of arm 10 draws the bar 22 longitudinally and actuates the lever 24 to shove the rod 26 upwardly, thereby swinging the signal 42 to carry its glasses over the light and extend its vane or indicating-board in an upward direction. This shifting of the signals sets a red light for the train approaching from the rear, thereby indicating the presence of a train in the block ahead to a train going in the same direction and displays a green light on the opposite side, which may be seen by the engineer upon looking to the rear. When the train passes from the first block into the second block, it is necessary to show a clear board at the initial signal-station, a result which is accomplished by the longitudinal movement of the bar 35, which movement draws upon the bar 75 through the connecting-cable 80 and actuates the lever 76 to swing the signal 79 to its normal position. At the same time the movement of said bar restores the shaft 73 and the curved depressible arm 72 thereon to their normal position for a succeeding operation. It is also necessary when the train passes from the first block into the second block to set a signal against a train entering the second block from the opposite direction. This is accomplished through the medium of the cable 81, which connects the forward end of the bar 22 with the rear end of the succeeding bar 35 in the third signal-station, causing the longitudinal movement of bar 22 to impart a like movement to said bar 35, thereby actuating the lever 38 in the third station to throw upwardly the signal 41 through the connecting-rod 40, thereby showing a green light to the engineer of the train passing along the track in the direction of the arrows and indicating a clear track and at the same time setting a red light against a train approaching from the opposite direction. It will now be understood that when a train passes the second signal-station it actuates the mechanism therein to clear the track at the first station, to reverse the signals at said second station, and to set the signals in the third station, thereby always maintaining a red light or danger-signal to a train approaching the block in which the train is moving from either direction and always showing a green light or clear track in advance and at the rear of said moving train. Upon reaching the third signal-station the operation described at the second station is repeated, whereby the signals at the third station are reversed, the track cleared at the second station, and a signal set at the fourth station in advance of the train, and so on the operation is repeated at each station or signal-tower at the termination of each block of the track. The terminal station of the block system, like the initial station, has but one set of signals and is shown at the extreme left of Fig. 1, its push-bar 82 being connected with the draw-bar 22 of the third station by the cable 83, whereby as the train passes said terminal station it actuates the arm 84 to rock the shaft 85 and swing the arm 86 to carry the bar 82 longitudinally to draw upon the rod 83 and actuate the signal mechanism at the third station to clear the track and at the same time operate the lever 87 to draw upon the rod 88 and swing the pivoted signal-arm 89 to show a clear track at said terminal station, so that the engineer of a train entering the third block of the system would know that the preceding train had passed from said block.

The operation of the signals by a train passing from right to left, as illustrated in Fig. 1, is practically repeated in Fig. 2, wherein is shown the signals actuated by a train passing from left to right and the mechanism for operating them. As before stated, these sets of mechanism for operating the signals by trains passing in opposite directions are preferably located in the same signal-tower; but, if desired, they may be located in separate towers on opposite sides of the track. The signals that are shown as actuated by a train passing from right to left are the lower signals, while the signals actuated by the passage of a train from left to right are the upper signals, as illustrated in Fig. 2, in which the mechanism at the first station becomes the initial mechanism and consists of the rock-shaft 90, the curved depressible arm 91, mounted thereon, and the arm 92 on the end of said shaft, to which is connected the draw-bar 93, which is drawn longitudinally as the shaft 90 is rocked through the depression of the arm 91 by the passage of the wheels over the track, thereby actuating the lever 94, which is pivoted to said bar and fulcrumed at 95, so as to shove upwardly upon the rod 96 and swing the pivoted signal-arm 97 so as to carry the lights therein over the signal-lamp and display a red light to an approaching train from the rear and a green light in the rear of the passing train. By the same movement of the bar 93 which actuates the lever 94 the cable 98, which is connected at one end to said bar and at the opposite end to the bar 61 of the succeeding signal station or tower, is drawn upon to pull the bar 61 longitudinally and actuate the lever 64, pivoted thereto, to shove upwardly upon the rod 66, pivoted to signal-arm 68, and swing said arm so as to carry the glasses therein over the signal-lamp to display a red light to a train approaching in the second block from the opposite direction and display a green light to the engineer of the train passing to the right to indicate a clear track. As the train passes the second station the mechanism therein is actuated to reverse the signals, as before described, and clear the track in the rear by restoring the signal at the initial station, at the same time setting the signals in the next station in advance, as before described, the operation being repeated as the train passes from one block into another. The second and third stations in Fig. 2 are actuated by the connecting rod or cable 99, and the operative parts in the third and fourth stations in said view are connected by the connecting-cable 100, the set at the fourth or terminal station having the rock-shaft 101 with the curved depressible arm 102 thereon, whereby the passage of the wheels of the train may rock said shaft to swing the arm 103, fixed thereon, and actuate the sliding bar 104 to operate the lever 105, pivoted thereto and suitably fulcrumed, whereby the rod 106, connected to said lever is actuated to swing the signal 107 to the normal position, or the position indicating a clear track. A more complete view of the parts shown at the right of Fig. 2 is illustrated in Fig. 15, and in Fig. 14 is an enlarged view showing more completely the mechanism at the left of Fig. 1, the upper portion of the signal-tower and the signal in said last-mentioned view being broken away.

It is evident that the depressible arms which actuate the rock-shafts that in turn operate the signal mechanism and which are located in the path of the flange of the wheels would both be actuated by a train passing in either direction if some provision were not made for drawing said arms out of the path of the flange of the wheels in alternate succession by the trains passing in opposite directions, so that only the arms designed to operate the signals for a train passing in one direction can remain in operative position. The mechanism for alternately moving said depressible arms out of the path of the flange of the wheels is illustrated more clearly in Fig. 3 and will be described with relation to to said figure, although said mechanism is also shown in elevation and in plan in Figs. 12 and 13. Fixed to shaft 8 so as to turn therewith is a crank-arm 108, to the free end of which is attached a rod 109, whose opposite end is pivotally connected to one terminal of a bell-crank lever 110, the opposite terminal of said lever being pivotally connected to one end of a draw-bar 111, whose opposite end is connected to a clamping-collar 112, which is seated in a circumferential channel in the sleeve 14, carrying the curved depressible arm 15, said sleeve being adapted to rotate or turn within said collar. By this arrangement when the train approaches from the right and depresses the curved arm 12 the shaft 8 will be actuated to operate the bell-crank lever 110 and draw the sleeve 14 longitudinally upon shaft 6, thereby moving the arm 15 longitudinally on shaft 6 under the guard-rail 3ª, the under side of which is cut out, as at 113, for that purpose, as shown by dotted lines in Figs. 13 and 18, whereby the depressible arm 15 is carried out of the path of the passing wheels and is not in a position to be actuated thereby until restored by the train as it passes from the block and actuates the mechanism at the succeeding signal-station, the operation of which mechanism, as before described, draws upon the rod 81 and pulls the bar 22 longitudinally, thereby rocking shaft 8, so as to restore it to its normal position and raise the depressible arm 12, at the same time operating the bell-crank lever 110 in the opposite direction to carry the sleeve 14 back to its original position and place the depressible arm 15 in the path of the wheels of a train approaching from the left. The same arrangement is employed to draw the compressible arm 12 on shaft 8 out of operative position when arm 15 on shaft 6 is depressed by a train moving to the right, said mechanism consisting of a crank-arm 114, fixed to the shaft 6, to which is pivoted a connecting-rod 115, the opposite terminal of said lever being connected to a bar 117, which is attached to a clamping-collar 118, seated in a peripheral channel of the sleeve 11 and within which said sleeve is free to oscillate, whereby the rocking of shaft 6 will actuate the bell-crank lever 16 to slide the sleeve 11 and carry the attached depressible arm 12 under the guard-rail 3, said parts being restored in a manner previously described.

In order to compensate for any variation in the movement of the signal-operating parts in the several signal-stations which are connected by the cables or connecting-rods leading from one to the other, said rods or cables are preferably jointed, as shown in Fig. 16, wherein the ends of the rod-sections are provided with right-angular portions 119, through which the opposite parts of the rod-sections pass, there being a compressible spring 120 interposed between the ends 119, whereby should the rod be drawn upon in either direction a distance in excess of what is required to operate the signal mechanism the spring 120 will compress, thereby preventing injury to the signal mechanism, the tension of the spring 120 being sufficient to operate the signals, so that it is only compressed when the movement of the rod 81 is in excess of what is required for a perfect operation of the connected parts.

In order to arrest the curved depressible arms of the track mechanism when returned after being depressed, so as to cause them to stand at the proper elevation, an angular projection 121 (see Fig. 9) may be formed thereon, which will engage a shoulder 122 on one of the rails, whereby said arm will be stopped when it is returned to its proper position.

While we have shown the depressible arms as being adapted to be actuated by the wheels of a car or train, it is evident that said arms may be arranged to be actuated by any part of the car without departing from the spirit of our invention.

Having thus fully set forth our invention, what we claim as new, and desire to secure by Letters Patent, is—

1. In a railway block-signal system, the combination of a plurality of signal-stations, each station having a plurality of movable signals, mechanism at each station for operating the signals adapted to be actuated by a passing train, the signal-operating mechanism for the several stations being connected mechanically to display a warning-signal a block ahead of the advancing train, and to display at the same station a signal indicating for said train a clear track, at the same time setting a warning-signal in the rear of the moving train, to prevent a train following entering the block occupied by the first-mentioned train.

2. In a railway block-signal system, the combination of a plurality of signal-stations dividing the track into blocks, movable signals for each station, mechanism connected with each station for operating its signals, the mechanism of the several stations being mechanically connected, and means connected with the signal-operating mechanism adapted to be actuated by a moving car, for setting a warning-signal in the rear of said car, and also in the block in advance thereof, and at the same time indicating a clear track in the block occupied by said car, and means actuated by the car in passing into the succeeding block for clearing the signals in the block last occupied by said car.

3. In a railway block-signal system, the combination of a plurality of signal-stations dividing the track into blocks, movable signals at each station, means at each station for operating said signals, means connecting the signals of the several stations, means connected with each set of signal-operating means at each station adapted to be actuated by a passing car moving in either direction for setting the signals in advance of the moving car, and in the rear thereof and for simultaneously clearing the signals from the block last occupied by said car.

4. In a railway block-signal system, the combination of a plurality of signal-stations dividing the track into blocks, each of said stations having a plurality of reciprocatory signals, means at each station for actuating said signals, means connecting mechanically the signal-actuating means of the several stations, track mechanism at each station connected with the signal-actuating means adapted to be actuated by a passing car to change the signals at the station whose mechanism is immediately actuated by the car in passing, and to set the signals at the stations in the rear and in advance of said car.

5. In a railway block-signal system, the combination of a plurality of stations dividing the track into blocks, each station having a plurality of signals, means at each station for operating said signals, track apparatus for actuating the signal-operating means at each station, said track apparatus being adapted to be actuated by a passing car, means connecting the signal-operating means of the several stations, operated by the actuation of the track apparatus at an intermediate station by a passing car or train, to cause a change of the signals at said intermediate station, and to simultaneously set the signals at the stations on opposite sides of said intermediate station.

6. In a railway block-signal system, the combination with a plurality of signal-stations, of movable signals in said stations, means for actuating said signals, track mechanism for operating the signal-actuating means adapted to be operated by a passing car, means connecting said signal-stations operated by a passing car at any one station to set a signal in the station which the car is passing, and also in the station in advance, and to operate said signals to show a clear track at both stations by the actuation of the mechanism at the station in which the advance signal was set when the car passes said advance station.

7. In a railway block-signal system, the combination with a signal-station, of two sets of signals therein, means for operating said signals independently, a track mechanism for each set of signal-operating means, a movable member in each track mechanism, through the medium of which it is operated by a passing car, and means connecting said movable members to withdraw one from action when the other is actuated to operate a set of signals.

8. In a railway block-signal system, the combination with a signal-station having two sets of signals therein, means for operating each set of signals independently, a track apparatus connected with each set of signal-operating means having a movable member adapted to be engaged by the wheel of a car to operate said apparatus, each of said movable members being slidable out of the path of said wheels, means connecting said members to slide one out of operative position when the other is depressed.

9. In a railway block-signal system, the combination of a signal-station, two sets of signals therein, means for independently operating said signals, track mechanism connected with the signal-operating means, adapted to be actuated by the wheels of a car, one part of said mechanism operating one set of signals when the car is passing in one direction, the other mechanism operating the other set of signals when the car is passing in the opposite direction, and means for preventing the actuation of but one set of signals by the passage of the car in either direction.

In testimony whereof we sign this specification in the presence of two witnesses

WILLIAM H. WILSON.
SAMUEL A. WILSON.

Witnesses:
 E. S. WHEELER,
 I. G. HOWLETT.